J. C. FOWLER.
Running Gear for Wagons.
No. 229,994. Patented July 13, 1880.
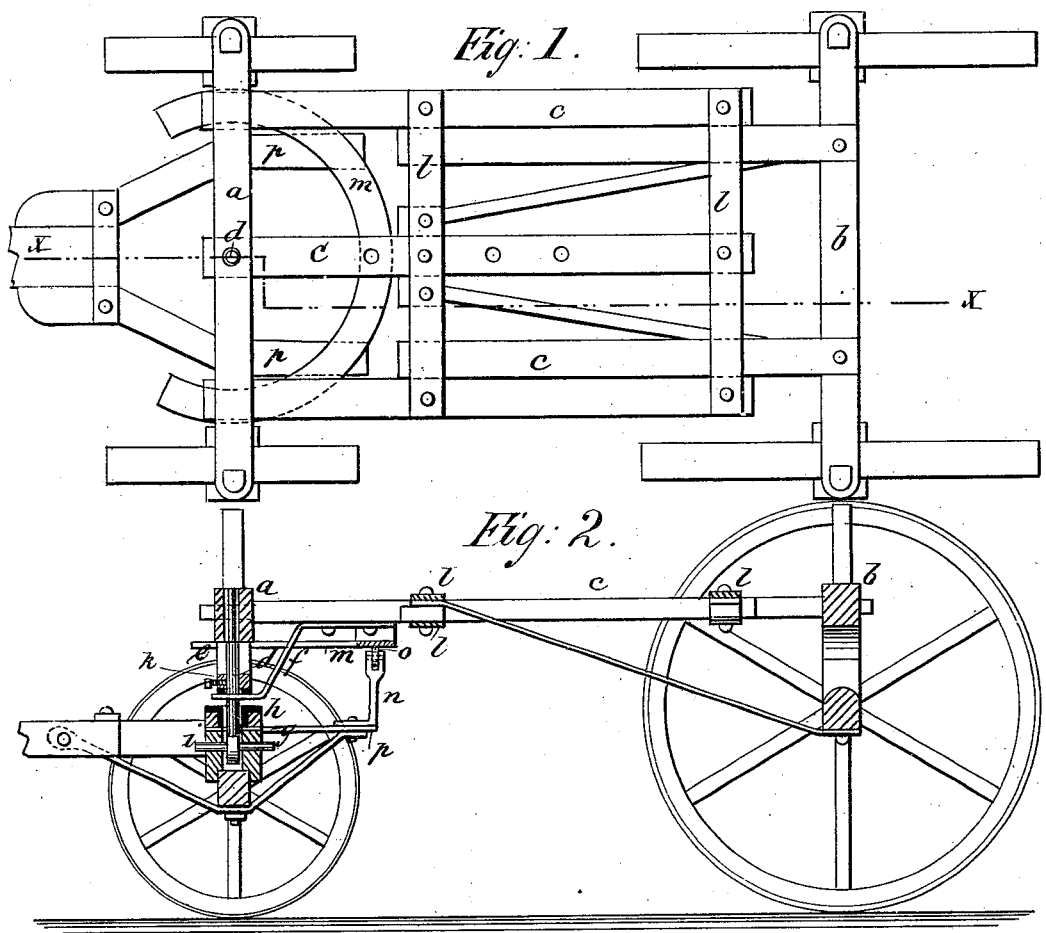

UNITED STATES PATENT OFFICE.

JOSEPH C. FOWLER, OF ARCOLA, TEXAS, ASSIGNOR TO HIMSELF AND JOHN H. B. HOUSE, OF SAME PLACE.

RUNNING-GEAR FOR WAGONS.

SPECIFICATION forming part of Letters Patent No. 229,994, dated July 13, 1880.

Application filed January 14, 1880.

*To all whom it may concern:*

Be it known that I, JOSEPH C. FOWLER, of Arcola, in the county of Fort Bend and State of Texas, have invented a new and Improved Wagon-Coupling, of which the following is a specification.

My improvements relate to king-bolts and coupling devices for connecting the forward axle of wagons, carriages, and other vehicles; and the invention consists in a king pin or bolt which passes from a socket in the bolster through braces and enters a socket in the top bar of the axle, where it is held by a cross-pin, the bolt and braces thereby sustaining the weight. The lower end of the bolt is formed as a rounded bearing in a direction transversely of the vehicle, so that the forward wheels and axle may conform to the ground without effect on the wagon-body.

The construction will be more particularly described with reference to the accompanying drawings, and the invention pointed out in the claims.

In the drawings, Figure 1 is a plan view of a wagon fitted with my improved coupling device. Fig. 2 is a vertical longitudinal section of the same on line *x x*. Fig. 3 is a vertical transverse section through the forward axle.

Similar letters of reference indicate corresponding parts.

The invention may be applied in connection with road-wagons, cane-wagons, or other vehicles. As shown in the drawings, it is applied to a road-wagon having an extensible frame; but I do not limit myself to any special form of running-gear.

The forward bolster, *a*, and rear bolster, *b*, are connected by a central and side reaches, *c*. The rear bolster, *b*, is supported upon the rear axle by blocks in any usual manner, while the forward bolster, *a*, is sustained by the curved brace *e* and bolt *d*, as next described.

In the bolster *a* is fitted a metal tube or socket for receiving the end of bolt *d*, which is turned down to form a shoulder that rests against the under side of *a*, or upon an interposed plate. The curved brace *e* is attached rigidly to the under side of bolster *a*, and is formed with an aperture for the passage of the bolt *d*. There is also a brace, *f*, that is attached to the central reach, *c*, and bent downward, with its forward end above or below brace *e*, which brace is also apertured for the bolt *d*, so that the bolt is sustained in every direction against any tendency to bend it, and the braces assist in sustaining the weight of the wagon-body.

Upon the wooden bar *g*, that is fixed to the forward axle, is attached a plate, *h*, preferably of wood. The plate *h* and bar *g* are slotted to receive the lower end of bolt *d*, the slot being in width slightly more than the diameter of the bolt, elongated in a direction transversely of the wagon, and it may be extended partially through bar *g*, or entirely through, so that the iron axle forms the bottom of the slot. The lower portion of bolt *d* is flattened, and the end resting on the bottom of the slot in *g* is rounded or formed in the arc of a circle. In this rounded end is an aperture for a cross-pin, *i*, that passes loosely through *d* and through the axle-bar *g*, so as to prevent separation of the bolt accidentally, but permitting uncoupling when desired. Upon the bolt *d*, above the braces *e f*, is a collar, *k*, held to *d* by a set-screw, so as to prevent disconnection of bolt *d* from the bolster *a*.

By the above-described construction the axle-bar *g*, plate *h*, and bolt *d* turn together, the bolt turning in the socket of the bolster *a*. The bolt *d*, with the braces *e f*, sustains the weight, and the forward axle, with the bar *g* and plate *f*, may swing transversely on the king-bolt on uneven ground without throwing the wagon-body out of level. The front wheels may also pass under the reach, which permits a short turn to be made with the wagon.

To allow extension of the wagon with a king-bolt, as described, the side reaches, *c*, are made in two portions, one portion connected to the forward bolster and the other portion to the rear bolster, the two parts being connected by cross-bars *l l*, so as to slide upon each other. The central reach, *c*, is connected to rear bars *l* and passes between the forward bars *l*, and by means of a pin inserted through holes in bars *l* and reach *c*, the parts may be held as adjusted in length.

If desired, a fifth-wheel may be combined with the coupling, as shown.

To the under side of the reaches *c* is attached a plate, m, of semicircular form, and the hounds p extend back of the forward axle and carry a curved brace, n, that is fitted with a friction-roller, o, which bears on the under side of plate m and rolls thereon as the wagon turns. This construction relieves the strain on the king-bolt and gives a support behind the axle without interfering with the oscillations of the wagon.

Having thus described my invention, I claim as new and desire to secure by Letters Patent—

1. The combination, with pin i and bolt d, the latter having arc-shaped, slotted, and flattened end, of the plate h and bar g, transversely slotted, as shown and described.

2. In wagon-couplings, the circle-plate m, brace n, and roller o, combined with the bolt d, the hounds p, slotted axle-bar g, bolster a, and braces e f, substantially as and for the purposes set forth.

JOSEPH C. FOWLER.

Witnesses:
JOE C. ABY,
H. T. GRAVES.